Patented Mar. 2, 1954

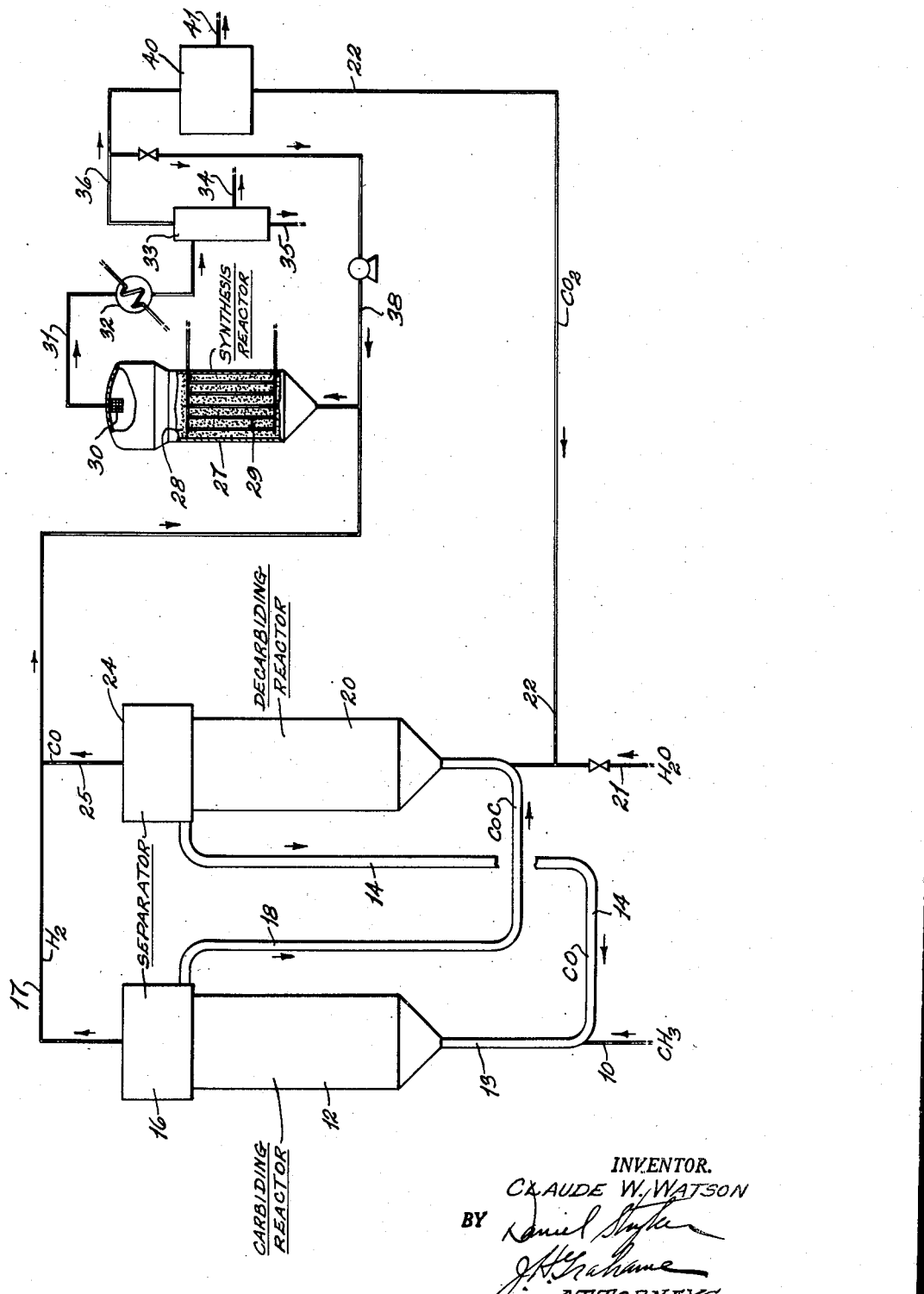

2,671,014

UNITED STATES PATENT OFFICE 2,671,014

METHOD FOR PRODUCING A SYNTHESIS GAS

Claude W. Watson, Port Arthur, Tex., assignor to The Texas Company, New York, N. Y., a corporation of Delaware Application November 10, 1949, Serial No. 126,492

2 Claims. (Cl. 48—196)

The present invention relates to the catalytic synthesis of hydrocarbons, oxygenated hydrocarbons and mixtures thereof, and more specifically, is concerned with the preparation of synthesis gas comprising hydrogen and carbon oxide, particularly mixtures of hydrogen and carbon monoxide.

More specifically, the present invention contemplates reacting a carbonaceous feed material containing hydrogen with a metal which is capable of being readily carbided and subsequently decarbided. Reaction is effected at an elevated temperature in the range in which the carbonaceous material is decomposed to carbide the metal, liberating hydrogen which is separated and recovered. The resulting metal carbide thereafter is contacted, at an elevated temperature, with carbon dioxide to yield a stream of carbon monoxide and a decarbided metallic product which comprises either elemental metal or a lower carbide of the metal.

The stream of carbon monoxide, together with any additional hydrogen, is separated and recovered from the decarbided metallic particles, which thereafter may be continuously reacted with additional carbonaceous feed material in a continuously operating, cyclic process.

The metal carbide carrier, as above indicated, comprises a metal readily carbided at elevated temperatures by a carbonaceous material and subsequently which is capable of being readily reduced to the elemental metal by water vapor or carbon dioxide. Such, for example, are iron, nickel, cobalt, titanium, chromium, tungsten, manganese, and many others apparent to those skilled in the art, in view of the foregoing.

In general, the metals which carbide with ease under the conditions of the present reaction are commensurately susceptible to reduction in the presence of the contemplated decarbiding agents. Therefore, by judicious selection of a circulating metallic carrier, such as finely divided, solid particle iron or cobalt, the consumption of carbonaceous feed material and decarbiding agent may proceed rapidly to essential completion, forming continuous and substantial yields of relatively high purity synthesis gas.

Accordingly, the present invention is of particular advantage in realizing efficient and continuous transformation of an undesired hydrocarbon or the like into a mixture of hydrogen and carbon monoxide suitable for catalytic conversion into desired hydrocarbon or oxygenated hydrocarbon fractions. This follows from the fact that the finely divided, freshly decarbided metal particles are surprisingly effective in promoting the desired decomposition of the feed hydrocarbon. Therefore, it is particularly advantageous to continuously recycle the carbided metal to the carbiding zone and continuously return freshly decarbided particles to the carbiding zone in cyclic fashion.

In addition, the invention has the particular advantage of supplying the oxygen requirement of the product carbon monoxide in the form of a decarbiding agent which is readily available in a condition of relatively high purity and which can be derived from the by-products of hydrocarbon synthesis. Accordingly, it obviates the economically objectionable requirement for high purity molecular oxygen, heretofore found necessary from the standpoint of practical commercial operation. Actually, as will hereinafter appear, decarbiding of the metal may be effected by the by-product carbon dioxide generally present in the product gases formed during catalytic synthesis of hydrocarbons.

It is particularly important to note, as intimated above, that in accordance with the present invention, decarbiding of the metal carbide takes place in a stream of carbon dioxide so regulated as to reduce the metal not beyond the elemental form, or to a lesser, intermediate condition of carbiding highly effective for promoting the decomposition of the hydrocarbon feed. In other words, the extent of reaction between the decarbiding agent and the metal carbide is preferably not permitted to exceed reduction of the carbided metal to the elemental form. As a result, the withdrawn decarbided vehicle or carrier is substantially free of oxides or other substances which have been found to result in undesired side reactions, which lower the yield and purity of the product and impair the desirable high rate of decomposition of carbonaceous feed material which characterizes the freshly decarbided metal particles.

In order to facilitate an understanding of the more specific details of the present invention, reference is had to the attached drawing wherein one embodiment of the invention is disclosed more or less diagrammatically.

Therein, a carbonaceous feed material such as methane, vaporized residual fuel oil or a mixture thereof, passes from a suitable source not shown, through line 10 into the lower portion of the carbiding reactor 12, through standpipe 13. In the standpipe 13, the feed stream picks up finely divided particles of previously decarbided cobalt continuously delivered through pipe 14, as will hereinafter appear. In the reaction zone 12, the fine, solid particles flow upwardly with the reactant vapor gases at a temperature above 1300° F., preferably in the range of about 1500–2400° F. and above. The decarbided particles are preferably in the form of an impalpable powder, the major portion of which has a particle size of less than 10 microns in diameter. The flow of hydrocarbon and powder is regulated so that during passage through the reaction zone, the hydrocarbon is substantially and preferably essentially completely decomposed, yielding a mixture of free hydrogen and relatively highly carbided particles.

Separation of the product gas from the solid carbide particles is effected in a separator diagrammatically indicated by the reference numeral 16. The specific form of separator is manifestly immaterial to the present invention and may comprise any effective, cyclonic, electrostatic or any other conventional gas-solid separating means or filters. Actually, in view of the particular utility of carbon carrier metals such as cobalt, nickel and iron which are essentially magnetic in character, it is important to note that magnetic separation is particularly applicable.

Product gas discharges from separator 16 into header 17, the separated carbide passing into standpipe 18 through which it moves downwardly for injection into the bottom of decarbiding reactor 20.

In reactor 20, solid particles of carbide are carried upwardly in a stream of decarbiding agent at an elevated temperature effective to reduce the carbided metal and yield pure carbon monoxide. The carbiding agent may comprise an essentially pure stream of carbon dioxide recovered from the product gases of the hydrocarbon synthesis step, as hereinafter disclosed, and cycled through pipe 22.

The stream of decarbiding gas flows at a sufficient rate to entrain the particles in pipe 18 and inject them upwardly into reactor 20.

The decarbiding zone 20 is maintained, by means not shown, at an elevated temperature above 1300° F. and preferably, in the range of 1500–2800° F. or above, and contact is maintained for a sufficient period of time to effect substantial consumption of the decarbiding agent and substantial reduction of the cobalt particles.

The resulting mixture of reduced particles and product gas passes into a separator 24 of the same character as previously described separator 16, from which the solid particles discharge into the aforementioned standpipe 14 for return to reactor 12, while the residual gases pass overhead through line 25 into header 17.

As indicated, the gases in header 17, consisting essentially of hydrogen and carbon monoxide, flow as a uniform mixture into the bottom of synthesis reactor 27 containing a mass of suitably active hydrocarbon synthesis catalyst, as for example, a promoted catalyst metal of the iron group or ruthenium.

In the embodiment shown, the catalyst assumes the form of a dense fluid phase of finely powdered, solid particles rising to the pseudo-liquid level 28 and held at uniform, predetermined temperature in the range of about 400 to 750° F. by a tubular exchanger 29, supplied internally with a coolant such as water or "Dowtherm."

Preferably, an iron catalyst is employed, in which case operating temperature is in the range of 550–700° F., and operating pressure preferably ranges from 100 to 600 p. s. i. g. The effluent products of reaction withdrawn from reactor 27 pass through a filter 30 into outlet line 31 which leads to condenser 32 and decanter 33, wherein a separation occurs between the normally fluid and normally gaseous constituents. The product oil layer is withdrawn through line 34, the water layer through line 35, and the residual normally gaseous overhead through line 36.

Recycle of a portion of the gaseous constituents is desirably effected through recycle through branch pipe 38 leading to the inlet of the synthesis reactor 27, as shown.

The remainder of the gaseous fraction in line 36 passes to a gas plant, more specifically indicated by reference numeral 40, wherein separation of carbon dioxide takes place for discharge through the aforementioned pipe 22. The residual gases are vented through pipe 41.

It will be apparent from the foregoing that the gas plant may comprise any suitable carbon dioxide absorption and stripping system, such for instance, as the Girbotol process, using a triethanolamine as the absorption agent.

The stream of carbon dioxide thus fed to the decarbiding reactor 20 provides a continuous source of decarbiding agent. A substantial stream of this reactant may be caused to flow continuously in pipe 22 when the hydrocarbon synthesis catalyst employed in reactor 27 is an iron-containing catalyst. This is true to a varying degree with other catalysts and only to a lesser extent where the hydrocarbon synthesis catalyst comprises cobalt.

However, as above intimated, cobalt, nickel and ruthenium catalysts may be employed at elevated operating temperatures within the range of about 350–700° and under pressures from atmospheric upwardly. The invention contemplates the use of such catalysts in an active form, promoted or activated by conventional modifying agents such as the oxides of the alkali and alkaline earth metals, alumina, titanium oxide, magnesium oxide, thorium oxide and many others. While reference has been made to fluid catalyst operation, the invention contemplates any conventional form of contact, e. g., fixed bed, moving bed or a suspensoid operation.

Reverting more specifically to the gas preparation steps, it is to be understood that contact is not necessarily limited to the cocurrent flow of solid particles and gaseous reactants disclosed for the purpose of illustration. On the contrary, it is advantageous from the standpoint of substantially reaching reaction equilibrium and accordingly realizing high yields of the desired products, to pass the vapors through a mass of catalysts, preferably in countercurrent relation. Therefore, it is contemplated, for example, passing the reactant gases upwardly in reactors 12 and/or 20, through a fluidized mass of carbided or decarbided particles in dense fluidized condition. Alternatively, the reactants may flow upwardly through a downwardly moving bed of solid particles with bottom particle draw-off such that substantially pure gaseous product streams are withdrawn from contact with the particles in the upper portion of the reactor while the particles of carbon carrier are discharged at the bottom in a high state of carbiding or decarbiding, as the case may be.

As previously indicated, the provision of finely powdered metallic carbon carrier particles is advisable from the standpoint of expediting the rate of the desired reactions. However, a similar effect may be achieved with some of the larger particles which tend to present a considerably increased active surface area as a result of repeated prior oxidation and reduction. In general, such particles may broadly range from about 80 mesh down to the finest particle size which can be prepared.

Therefore, it is apparent that repeated, alternate carbiding and decarbiding of the metal particles results in the desirable condition of high activity such that the reactions of carbiding and decarbiding are very rapid. This accordingly enables the passage of the reactant gas through a mass of particles sufficiently large to effect a clean separation between the effluent gases and separate withdrawal of both gases and solids. It has the important advantage intimated above, of promoting completion of the reaction which follows from passing the gases countercurrently to the reacting particles.

Therefore, it is preferred to cause the catalyst to gravitate, shower or gradually move downwardly countercurrent to the upflowing reactants in such a manner that the particles are withdrawn at the bottom in highly reacted condition. If desired, contact may be effected in a series of fluidized, solid particle beds, each bed discharging solids into a subsequent fluid phase bed, through which the reactant gas is passed in series relationship and countercurrent to the flow of solid particles.

In accordance with one example of the invention, finely powdered elemental iron is continuously subjected alternately to contact with methane and substantially pure carbon dioxide. In each case, contact is effected at a temperature of about 2000° F. under a pressure of about 18 atmospheres, with the gas passing through the powder for a contact time of about one minute. During introduction of methane, about 95.7% of the available hydrogen in the methane is converted into molecular hydrogen which is withdrawn from the contact particles as a substantially pure stream. After a substantial period of operation, the solid particles comprise essentially iron carbide.

When conversion falls off substantially from the indicated level, the step is terminated, and thereafter, a stream of carbon dioxide is introduced at approximately the same rate as before and under identical reaction conditions, yielding a product gas comprising over 99% carbon monoxide, which is withdrawn from the upper surface of the particle bed.

Introduction of the carbon dioxide stream is continued until conversion falls appreciably from this level, whereupon it is terminated. At this time, the particle mass comprises iron particles at a relatively low state of carbiding. This is again subjected to the methane feed at the same conditions as before, and the process continuously and cyclically repeated.

The total gaseous products, withdrawn from contact with the particles and mixed, comprise hydrogen and carbon monoxide in the approximate molar ratio of 1:1.

Manifestly, the reaction temperatures employed in connection with the illustrative examples above are characteristic of the specific metallic carbon carrier illustrated, namely, iron. However, optimum temperature may vary somewhat with the metal employed. In general, reaction temperatures are advantageously above about 1000° F. and preferably, as indicated, above 1300° F. with most favorable results accompanying an increase in temperature above these levels.

It is to be understood that the term "carbonaceous material containing hydrogen," contemplates, in particular, hydrocarbon fractions, and preferably hydrocarbon gases such as natural gas, methane and $C_2$-$C_4$ hydrocarbons.

It also includes the normally liquid hydrocarbon fractions, as for example, crude oil, reduced crude, and residual and recycle fractions, such, for example, as recycle gas, oil and tars. Advantageously, the normally liquid fractions are vaporized before contact with the carbidable metal particles.

However, in its broadest aspect, it covers tarry and even solid fractions including coals which contain a substantial proportion of hydrogen. Advantageously, the solid materials are employed either in the finely powdered form or after liquefaction by heat and pressure according to known procedures. It is believed significant, however, that the reaction of solid carbonaceous particles with the previously decarbided, readily carbidable metal particles occurs readily under commercially feasible conditions.

It is to be particularly understood that the embodiment illustrated in the drawing, in order to prevent confusion, omits many conventional details which, per se, form no part of the invention and are obvious to those skilled in the art in light of the foregoing disclosure. For example, it does not disclose specific provision for maintaining the reaction zones at the disclosed temperatures. Manifestly, however, any conventional form of heating, either internal or external, may be used. Thus, the reaction zones may be associated with firing chambers which continuously supply thermal energy at the required high level to maintain the temperatures specified. Alternatively, heated thermophores may be injected into the reaction zone or the supply of thermal energy provided by electrical heating or in any other conventional manner.

Obviously, many modifications and variations of the invention as above set forth may be made without departing from the spirit and scope thereof, and therefore, only such limitations should be imposed as are indicated in the appended claims.

I claim:

1. In the production of synthesis gas comprising essentially hydrogen and carbon monoxide, for the catalytic production of desired fractions of hydrocarbons, oxygenated hydrocarbons and mixtures thereof, the improvement which comprises reacting a hydrocarbonaceous feed material with a finely divided, solid particle metal, capable of being readily carbided and subsequently decarbided, in a carbiding zone at an elevated temperature in the range at which said hydrocarbonaceous material is decomposed to liberate hydrogen and form finely divided, solid particle metal carbide, recovering said product hydrogen, withdrawing said solid particle metal carbide from said carbiding zone to a decarbiding zone, thereafter reacting said metal carbide in said decarbiding zone with substantially pure carbon dioxide in such amount as to reduce substantially all of the metal carbide to the elemental form and at an elevated temperature such that the carbon dioxide is converted into carbon monoxide and said metal carbide is reduced to a solid particle relatively decarbided form, recovering said product carbon monoxide, withdrawing the relatively decarbided metal particles from the decarbiding zone returning them to the carbiding zone and mixing the hydrogen and carbon monoxide so formed to form a synthesis gas.

2. The method according to claim 1 wherein the metal carbide is continuously cycled from the carbiding zone to the decarbiding zone and the relatively decarbided metal is continuously cycled to the carbiding zone whereby to effect repeated alternate carbiding and decarbiding thereof.

CLAUDE W. WATSON.

References Cited in the file of this patent

UNITED STATES PATENTS

| Number | Name | Date |
|---|---|---|
| 1,592,861 | Leonarz | July 20, 1926 |
| 1,803,221 | Tyrer | Apr. 28, 1931 |
| 1,992,909 | Davis | Feb. 26, 1935 |
| 2,264,427 | Asbury | Dec. 2, 1941 |
| 2,436,938 | Scharmann et al. | Mar. 2, 1948 |
| 2,464,532 | Sellers | Mar. 15, 1949 |
| 2,471,104 | Gohr | May 24, 1949 |
| 2,485,875 | Gorin et al. | Oct. 25, 1949 |
| 2,523,284 | Eastman | Sept. 26, 1950 |
| 2,535,042 | Cohn et al. | Dec. 26, 1950 |

FOREIGN PATENTS

| Number | Country | Date |
|---|---|---|
| 51,572 | Germany | Mar. 17, 1890 |